US008353704B2

(12) United States Patent
Kortas et al.

(10) Patent No.: US 8,353,704 B2
(45) Date of Patent: Jan. 15, 2013

(54) TRAINING SIMULATOR

(75) Inventors: Adrienne Kortas, Edina, MN (US);
Jamie Furey, Minneapolis, MN (US);
Jennifer Stone, Ham Lake, MN (US);
Manoj Pampady, Bangalore (IN)

(73) Assignee: Target Brands, Inc., Minneapolis, MN (US)

( * ) Notice: Subject to any disclaimer, the term of this patent is extended or adjusted under 35 U.S.C. 154(b) by 813 days.

(21) Appl. No.: 12/499,472

(22) Filed: Jul. 8, 2009

(65) Prior Publication Data
US 2011/0008758 A1  Jan. 13, 2011

(51) Int. Cl.
G09B 19/18 (2006.01)
G09B 19/00 (2006.01)

(52) U.S. Cl. ........................... 434/107; 434/219

(58) Field of Classification Search .......... 434/219, 434/236, 323–322, 350
See application file for complete search history.

(56) References Cited

U.S. PATENT DOCUMENTS

| | | | | |
|---|---|---|---|---|
| 3,423,851 | A * | 1/1969 | Olalainty | 434/164 |
| 3,526,044 | A * | 9/1970 | Dwiggins | 434/373 |
| 3,613,266 | A * | 10/1971 | Conway | 434/322 |
| 5,813,862 | A * | 9/1998 | Merzenich et al. | 434/185 |
| 6,029,159 | A | 2/2000 | Zorba et al. | |
| 6,071,123 | A * | 6/2000 | Tallal et al. | 434/116 |
| 6,123,548 | A * | 9/2000 | Tallal et al. | 434/185 |
| 6,231,344 | B1 * | 5/2001 | Merzenich et al. | 434/236 |
| 6,302,697 | B1 * | 10/2001 | Tallal et al. | 434/185 |
| 6,322,367 | B1 * | 11/2001 | Marshall | 434/178 |
| 6,413,092 | B1 * | 7/2002 | Tallal et al. | 434/116 |
| 6,413,093 | B1 * | 7/2002 | Tallal et al. | 434/185 |
| 6,413,094 | B1 * | 7/2002 | Tallal et al. | 434/185 |
| 6,413,095 | B1 * | 7/2002 | Tallal et al. | 434/185 |
| 6,413,096 | B1 * | 7/2002 | Tallal et al. | 434/185 |
| 6,413,097 | B1 * | 7/2002 | Tallal et al. | 434/185 |
| 6,413,098 | B1 * | 7/2002 | Tallal et al. | 434/185 |
| 6,944,596 | B1 | 9/2005 | Gray et al. | |

(Continued)

FOREIGN PATENT DOCUMENTS
WO   WO 9852175   11/1998

(Continued)

OTHER PUBLICATIONS

Cambrian House. "Options Trading Simulator—With Expert Feedback." [retrieved on Jul. 7, 2009.] Retrieved from the Internet <URL: http://www.cambrianhouse.com/idea/idea-promoter/ideas-id/tmskuIp/>.

Enspire Learning. "Leadership Simulation: Executive Challenge." [retrieved on Jul. 7, 2009.] Retrieved from the Internet <URL: http://www.enspire.com/simulations/executivechallenge>.

(Continued)

Primary Examiner — Robert J Utama
(74) Attorney, Agent, or Firm — Merek, Blackmon & Voorhees, LLC

(57) ABSTRACT

A training simulator may be used to present a number of different scenarios to a user, and to evaluate the user's response to the scenarios. In some implementations, the training simulator may include a simulation timer that advances at a rate that is different than real-time, such as a real-time minute equaling an hour of simulated time. For each of the scenarios presented during a training episode, the user may respond by selecting one or more possible decision options, each relating to a different way to address the situation presented in the scenario. The user's response may be scored, according to certain implementations, by adjusting the value of multiple scoring metrics, each of which relates to a different user performance indicator.

20 Claims, 7 Drawing Sheets

U.S. PATENT DOCUMENTS

| | | | |
|---|---|---|---|
| 6,962,495 B2 | 11/2005 | Bajer et al. | |
| 7,089,222 B1 | 8/2006 | Lannert et al. | |
| 2002/0194056 A1 | 12/2002 | Summers | |
| 2003/0113700 A1 | 6/2003 | Simon | |
| 2004/0115599 A1* | 6/2004 | Haggerty | 434/169 |
| 2007/0207846 A1 | 9/2007 | Burak et al. | |
| 2008/0147585 A1 | 6/2008 | Lacey et al. | |
| 2010/0028839 A1* | 2/2010 | Tully et al. | 434/236 |
| 2011/0177480 A1* | 7/2011 | Menon et al. | 434/238 |
| 2011/0177482 A1* | 7/2011 | Katz et al. | 434/322 |
| 2011/0177483 A1* | 7/2011 | Needham et al. | 434/322 |

FOREIGN PATENT DOCUMENTS

| | | |
|---|---|---|
| WO | WO 2004021112 | 3/2004 |

OTHER PUBLICATIONS

Invensys SIMSCI-ESSCOR. "ETS: Expert Tutor System." 2006. Retrieved from the Internet <URL: http://www.ips.invensys.com/en/products/processdesign/Documents/ETS.pdf>.

IPS: Invensys Process Stystems. "Operator Training Simulation." [retrieved on Jul. 7, 2009.] Retrieved from the Internet <URL: http://ips.invensys.com/en/products/ots/Pages/Operator%20Training%20Simulation-P055.aspx>.

Wikipedia. "Where in the World Is Carmen Sandiego?" [retrieved on Jul. 7, 2009.] Retrieved from the Internet <URL: http://en.wikipedia.org/wiki/Where_in_the_World_Is_Carmen_Sandiego%3F>.

* cited by examiner

TRAINING SIMULATOR

BACKGROUND

Many companies have employee training programs in place for recently hired employees. For example, when new employees first report to work after being hired, they may be asked to attend individual or group orientation sessions. Training programs for new employees may be used to train the employees for their new positions, and may also be used to introduce them to various aspects of working at the company, such as its culture, policies, and internal procedures.

Employee training programs may also be offered to more experienced employees. Continuing education or other refresher courses may allow veteran employees to learn about new developments in a particular field or a particular part of the business. Such continuing courses may allow the employee to remain current. Training programs may also be used for veteran employees in situations where the veteran employee is taking on new responsibilities within the company or transitioning into a different role.

The goals of employee training may vary by the employer's business, but may sometimes include enhancing skills, transferring institutional knowledge, increasing employee knowledge or competency, improving confidence, or creating a stable and productive work environment. For example, employers may train their employees on a variety of different skills and even different types of skills, including for example, technical aptitude skills and personal interaction skills.

The length of employee training programs may vary, with some training programs lasting only a few hours, and other programs continuing for weeks, months, or even up to a year or more. In some cases, training continues throughout the employee's entire time with the company, such as through ongoing training seminars, refresher courses, and the like. The investment in time and resources is rarely wasted, as well-trained employees may often reward such an investment with increased efficiency and improved work product compared to an employee who has not been trained.

Different forms of employee training may be used by different employers. For example, some companies use internal training programs, while others may use outside trainers to conduct the training. As another example, some employers use paper-based training, while others may use on-the-job training. Sometimes a single company may use these and other training options in combination, or may use different training options for different employees.

SUMMARY

A training simulator may be used to present a number of different scenarios to a user, and to evaluate the user's response to the scenarios. In some implementations, the training simulator may include a simulation timer that advances at a rate that is different than real-time, such as a real-time minute equaling an hour of simulated time. For each of the scenarios presented during a training episode, the user may respond by selecting one or more possible decision options, each relating to a different way to address the situation presented in the scenario. The user's response may be scored, according to certain implementations, by adjusting the value of multiple scoring metrics, each of which relates to a different user performance indicator. In some embodiments, the value of the scoring metrics may be adjusted based on the user's response to the scenario and also based on the simulated time at which the response was received. The scoring adjustments may also take into account a user's previous responses, such as by scoring incorrect answers more severely if the user has already answered a similar question incorrectly. The training simulator may also include, in some implementations, a simulated user task list, with each of the tasks corresponding to a different scenario that the user can address.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1:
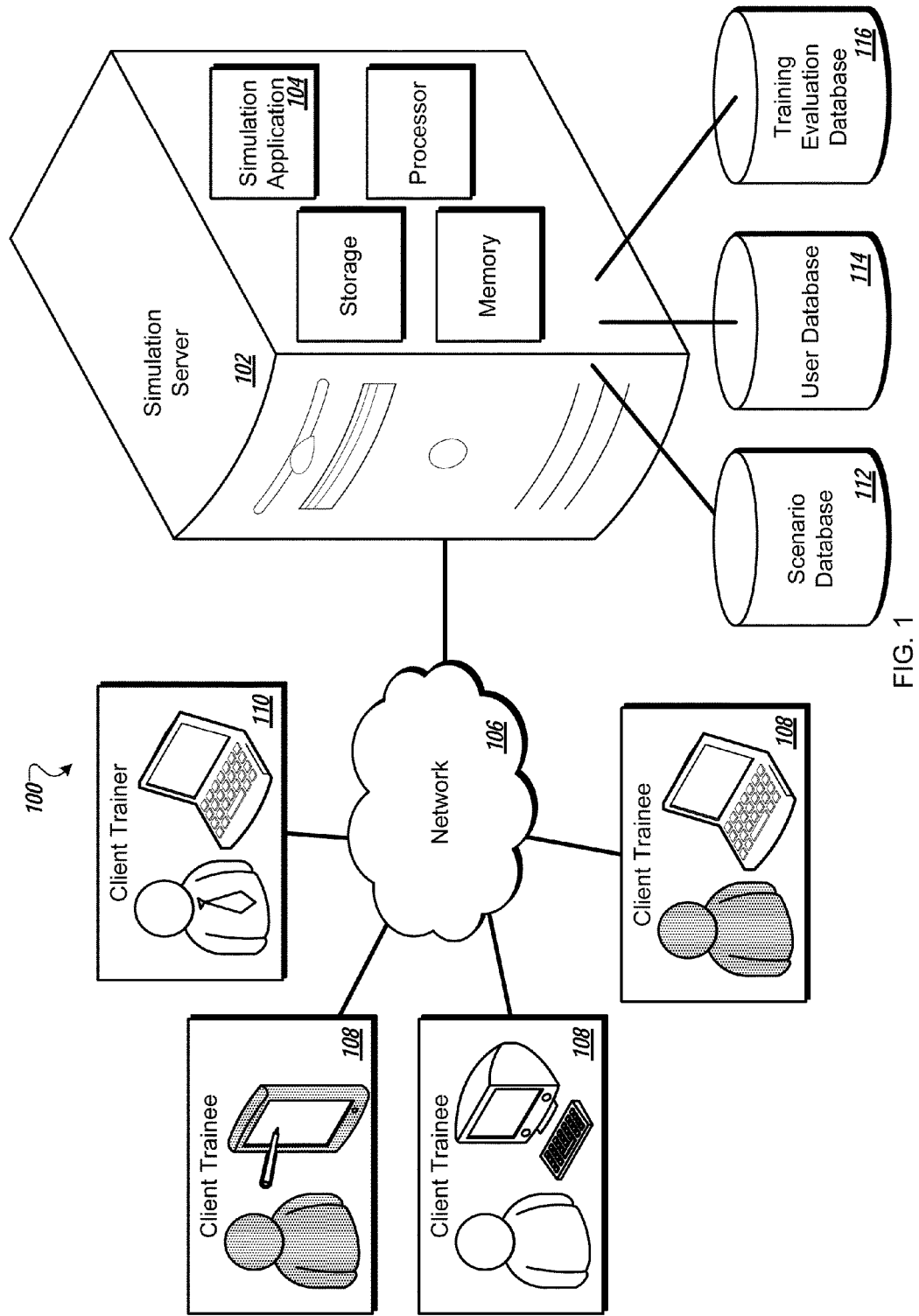
FIG. 1 shows a conceptual diagram of a representative training simulation system.

FIG. 1 shows a conceptual diagram of a representative training simulation system 100. A training simulation system 100 may be used to train users, such as new personnel, on a variety of different topics, such as how to efficiently evaluate information, how to make strategic decisions, how to manage time, and how to ask good questions, to name just a few examples. The training simulation system may be designed to mimic or simulate the systems and types of situations the users may encounter on a day-to-day basis.

The training simulation system may be used to elevate overall problem-solving and critical thinking skills of the users, improve speed-to competency, reduce the training program life-cycle, and/or provide experiential case-based learning, among other uses. The system 100 may generally be configured to simulate the impact of decision making on various performance measures and facilitate mentoring and coaching on the job by offering multiple interactive tools. In addition, a structured review process may also be associated with the training simulation, such that trainers, managers, or other appropriate personnel may work with the trainees before, during, and after the training sessions using the training system.

The example training simulation system 100 may include a simulation server 102, which may operate a simulation application 104. The simulation server 102 may be connected through a network 106 to one or more client trainee systems 108, and to one or more client trainer systems 110. The client trainee and trainer systems 108, 110 may include a web browser or a window-based user interface to access the application 104, to name just two examples.

In some implementations, a different number of client trainee systems 108 and client trainer systems 110 may be included in system 100. A typical training environment may include a number of trainee users, and may also include one or more trainers. For example, a number of trainee users may interact with the training simulation through a web browser, each user working with the training simulation via his or her own client trainee system 108. In another example, one or more trainee users may work together via a single client trainee system 108. During the course of a training simulation, the trainee users may be presented with one or more modules or episodes of a training simulation, each of which contains one or more different scenarios for the trainee to address. The trainee users may interactively progress through the training simulation at their own pace, or at the pace required by a trainer for example.

Other users, for example, a manager, may interact with the training simulation via a client trainer system 110. The manager's interaction with the training simulation may be different than the trainee interaction. For example, a manager may be able to review user scores, provide feedback to users, or edit various aspects of the simulation. The client trainee systems 108 and client trainer systems 110 may be any type of computing device that can communicate with the simulation server 102. For example, the systems 108, 110 may be laptop or desktop computers, handheld portable computing devices, or the like.

The simulation server 102 may be connected to various databases, such as a scenario database 112, a user database 114, and/or a training evaluation database 116. In some implementations, some or all of the databases may exist on the simulation server 102. In other implementations, some or all of the databases may exist in one or more different locations, and be communicatively coupled to the simulation server 102. In some implementations, the databases may be accessed by the simulation server 102 over a network 106 (e.g., a LAN, WAN, or other suitable network). The databases may be table based, and stored in a text file or Excel document. In another example, the databases may be relational, such as an Access, SQL, or mySQL database.

A scenario database 112 may be communicably coupled to the simulation server 102. The scenario database may include various types of information related to one or more training episodes or modules. For example, the scenario database may include questions, answers, advice, notes, emails, schedules, to-do lists, equations, variables, scenarios, and/or interrupters, to name just a few examples. The data stored in the scenario database may be used to present content and context to a user in an interactive training simulation.

The application 104 may be configured to access and process information from the scenario database 112. For example, the scenario database may include a scenario with a question for a user, such as "how much product should you buy, given a $15M budget?" The scenario and/or associated questions may be presented to a user of the client trainee system 108, for example via a graphical user interface of the trainee system 108. The application 104 may process responses or other inputs from the user, and may query or otherwise access additional material from the scenario database 112. In some implementations, the additional material may be based on responses to previous questions, previous user actions, or other events raised in the system.

A user database 114 may be communicatively coupled to the simulation server 102, for example via a network 106. The user database may contain information about users, such as usernames, passwords, demographic information, test scores, progress reports, permissions, and/or other user information. The application 104 may access the user database, for example, to verify a user of the client trainee system 108 or the client trainer system 110. In some implementations, the application 104 may also use information from the user database 114 to determine the information to present to the user, and/or information to access from another database, such as the scenario database 112. For example, a user who has successfully completed an episode or module may be granted access to review their scores, try again, or begin a new episode. In another example, a user of a client trainer system 110 may be able to edit information in the user database 114 to provide appropriate trainee access to episodes, scenarios, or other information.

A training evaluation database 116 may also be communicatively coupled to the simulation server 102, for example via a network 106. The training evaluation database 116 may be used to store historical training simulation data and trainee responses in order to gauge the effectiveness of the training program. The training evaluation database 116 may also be used to review episodes or specific scenarios in order to improve the training simulation.

The training evaluation database 116 may include information such as user responses, scores, metrics, times, and user actions to name a few examples. In some implementations, the application 104 may access the training evaluation database 116 to provide results of a simulation to the user of a client trainer system 110. For example, a user of the client trainer system may wish to review metrics relating to trainee responses to questions in a simulation. The user may then use information from the training evaluation database 116 to make changes to aspects of the training simulation stored in the scenario database 112. For example, if a trainer, upon reviewing statistics stored in the training evaluation database 116, determines that trainees were consistently scoring high on questions presented in a particular scenario, the trainer may wish to make the questions more difficult.

The training evaluation database 116 may also include reporting or tracking information relating to multiple users or groups of users, episodes, scenarios, and various training metrics. For example, the database 116 may include the scores of all trainees from training sessions that were taught by a particular trainer. These scores may be compared to the scores of trainees that attended different sessions taught by a different trainer. By comparing the respective scores, the trainers themselves may be objectively evaluated. Similarly, demographic analyses of the training simulation may be used to better focus particular training episodes to a specific target audience.

The architecture of the system 100 may also include other components (not shown). For example, the client systems may run a Flash-based front end, with HTML, XML, PHP, ASP, and/or Java components running on the client trainee or trainer systems, or on one of the other systems, such as the simulation server 102. Also, middle tier software, such as AMF PHP or PHP may facilitate communications between and among the various components and the backend databases. Administration software may also be used to facilitate communications with the databases, for example, to handle transactions in a SQL database. The simulation application 104 may be built on an object oriented language, with various classes and modules, as will be described in greater detail below.

The following example illustrates one possible overview of how a trainee may interact with the system 100, where the trainee is part of a new class of business analysts that has recently been hired by a company. The new business analyst trainee may log in to a client trainee system 108 through a log in screen presented in a web browser operating on the system 108. The client trainee system 108 may communicate over the network 106 with the simulation server 102, which may verify the analyst's access level by accessing information stored in the user database 114. Assuming the proper log in credentials were supplied, the simulation application 104 may access the scenario database to provide the analyst with a beginner-level training episode, specifically tailored to new business analysts that have recently joined the company.

The training episode may be presented to the business analyst on the client trainee system 108. Before the analyst begins and/or at various points during the simulation, the system 100 may provide instructions to the business analyst for using the simulation. The business analyst may work on completing a number of different training scenarios within the episode, and may receive feedback at various points within the simulation. For example, the analyst may receive feedback after every decision that is made. Upon completion of the episode, a summary of the analyst's overall feedback may be presented to the business analyst on the trainee system 108.

Throughout the simulation, or upon completion of the simulation, various performance metrics and results may be stored in the user database 114 and/or the training evaluation database 116. In particular, the user database 114 may store information related to the business analyst and the progress that was made during the training session. For example, the analyst's overall scores for the training episode may be stored in the user database 114. The training evaluation database 116 may store information and results related to the episode and how particular scenarios were addressed. For example, one such metric may be how long the analyst spent on each particular question. This information may be grouped or collated with the time other analysts spent on each question, and this information may be used to determine the difficulty of the question or the number of questions to include in a particular episode.

A manager or trainer may access the client trainer system 110 to review results and/or statistics, such as the results stored in the training evaluation database 116. For example, the manager may view a report on how training is improving the speed to competency for an individual or a group of individuals. In another example, a client trainer may wish to track individual or group statistics, such as the number of scenarios completed successfully. A client trainer may wish to compare scores between episodes for a user or a group of users, such as a particular class of trainees that the trainer is responsible for training. If the trainer identifies a trainee or group of trainees that are not performing as well as the other trainees, the trainer may work with those trainees to help improve their progress. Similarly, if a trainer identifies one or more trainees that seem to be working above the level of the rest of the group, the trainer may modify the episode for the particular trainee to make it more challenging, or the trainer may suggest that the trainee work through a more advanced episode.

The trainer may also view other types of data, and comparisons may be tracked and viewed, including classroom dynamics, demographic distributions, and the effectiveness of trainers, to name a few. A manager or other user with appropriate access may make changes to episodes stored in the scenario database 112, and may change the user access in the user database 114, such as by allowing the business analyst to access a new episode.

Figure 2:
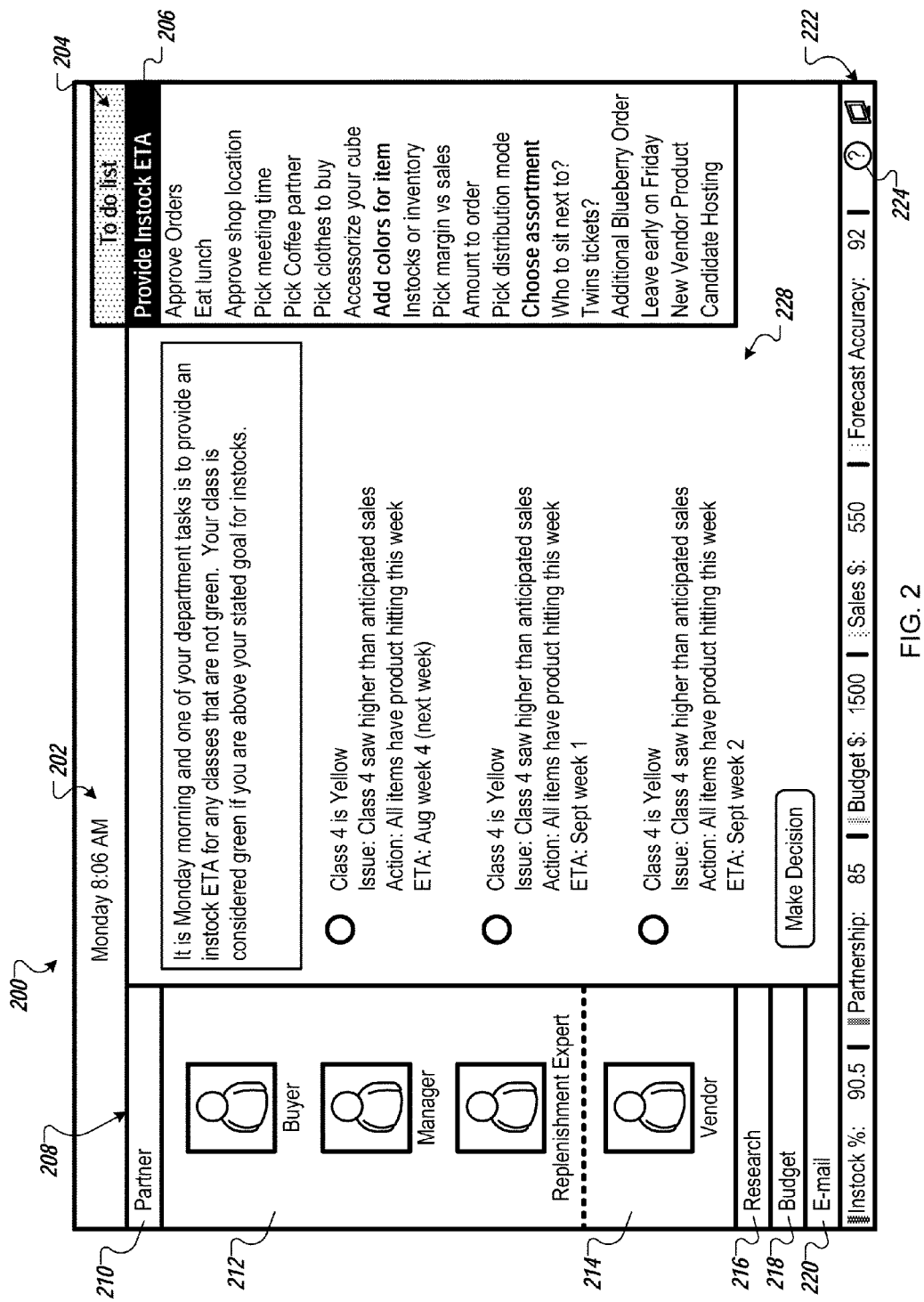
FIG. 2 shows a representative user interface of a training simulation.

FIG. 2 shows a representative user interface of a training simulation. A user may interact with the training simulation via a graphical user interface ("GUI") 200 on the client trainee system 108, for example. In some implementations, the GUI 200 may be presented in a web browser window. Alternatively the GUI may be presented by a non web-based client/server application. The GUI may be provided by the simulation application 104, or may be part of a stand-alone application on a client system, such as the client trainee system 108, or the client trainer system 110. The various elements presented within the GUI may be in various forms, such as text, audio, video, and/or multimedia.

The simulation application 104 may provide data to present within the GUI. For example, the simulation application 104 may access and process data contained within the scenario database 112, and present it to the user via the GUI 200. When the user interacts with the GUI 200, information may be sent to the simulation server 102, processed by the simulation application 104, and stored within a database, such as the user database 114 or the training evaluation database 116. Furthermore, the simulation application may provide appropriate responses to the users via the GUI.

In some implementations, data may be stored and processed locally, for example, on the client trainee system 108 or the client trainer system 110. Other users may interact with the same or a similar GUI on a different system. For example, the GUI a user interacts with may depend on the user's access level, competence level, or previous experience, to name a few examples. In some implementations, users may interact with each other through the respective GUIs on their systems. For example, the GUI may contain a chat module that allows a trainee to ask questions of a trainer, such as when the trainee and trainer are located remotely from one another. Similarly, trainees may be able to communicate with one another in certain implementations. The various objects presented in the GUI may be represented as classes or modules associated with the simulation application 104. For example, a graph module or class may be configured to parse an XML document and present the data on the GUI in a graphical format.

The GUI 200 may contain different presentation sections which, for example, may contain objects such as text, graphics, or other multimedia. In some implementations, the objects may be buttons that perform an action when selected. For example, when a user selects an object, the selected object and/or another object may change attributes (e.g., shape, color), may present a pop up window, may bring the user to another screen within the GUI, may open an interactive tool, or may do nothing (i.e. an informational object). Similarly, in some implementations, objects may change attributes or present a pop up window when a mouse cursor is positioned over or near the object, such as with a mouse-over effect. In some implementations, objects may change form or be highlighted to alert the user to new or urgent information.

The order in which a user accesses or interacts with some objects on the GUI may affect the user's scores, options, results and/or decision options in the simulation. For example, in certain situations, a particular option may only become available after the user has selected or interacted with another object. The first object, then, may be viewed as a prerequisite to accessing or viewing the second object.

The GUI 200 may contain a timer section 202. The timer section may show a real-time value or simulated date and/or time. In some implementations, the simulation, may, for example, simulate a work week in accelerated time. In such an example, one minute in the simulation may represent an hour of the work week. As such, the user may have to work quickly, and make strategic decisions in the limited time they are given (e.g., 40 minutes for a standard 40 hour work week). In such an example, non-working hours may automatically be skipped on the simulation timer. The training simulation may be configured to begin at a certain simulated time and/or date, and may also end at a later simulated time. For example, in the example of a 40 minute training module representing a 40 hour work week, the simulation timer may begin at 8:00 am on a Monday morning, skip all non-working business hours, such as from noon to 1:00 pm for lunch and 5:00 pm to 8:00 am, and end at 5:00 pm on Friday evening.

In some implementations, the timer may run continuously. For example, if one minute of simulation time represents an hour, the timer may change the minutes digits every second, since one second in the simulation represents a minute of work time. In another implementation, the simulation may keep track of small time changes without displaying those changes, and may only advance the digits in the timer section 200 after a set amount of time has passed, for example after one hour has passed in the simulation (one minute of real time).

Other methods of keeping time may be used, such as a turn-based method. For example, a user may have an unlimited amount of time to view the presented material and consider a response, but the timer may advance in response to a user action, such as clicking a button or object. In such an example, different buttons or objects may cause different amounts of simulated time to pass. For example, selecting an "eat lunch" task may cause a simulated hour to pass, whereas selecting "get coffee" may only take five simulated minutes. Furthermore, choosing an incorrect action may also penalize the user in timing and/or scoring. In some implementations, a combination of real-time and simulated or time-lapse time may be used. For example, selecting an activity may automatically cause five simulated minutes to pass, but if the user spends too long on the activity, every additional real-time minute the user spends may cause an additional simulated minute to pass.

In some implementations, the timer value may affect other elements within the simulation, such as choices, results, scenarios, options and/or scoring of decisions. For example, for a power plant operator simulation, the time of day may affect variables such as the base load on the system, and the number and type of generators running. These variables may have an effect on whether the choices a user makes are viewed as appropriate, and may therefore affect the scoring of the user's choices. Continuing with the previous example, the base load on the system may be at a minimum in the early hours of a day, so a user's decision to perform maintenance on the system during that time period may be viewed positively, whereas if the user chooses to perform maintenance during a more demanding period, a user's score related to minimizing the disturbance to customers may be adjusted downward to reflect the user's mistake. Similarly, performing maintenance may always be viewed as a positive score related to the integrity of the system, but such improvement in integrity may be greater if the maintenance is performed during off-peak hours (e.g., due to less potential for other integrity issues to arise if maintenance is done during those times). As such, a user's choice to perform maintenance may always result in a positive score, regardless of the timing of the action, but it may result in a greater positive score depending on the simulation time. The above example also illustrates the ability of the training system to use multiple different scoring metrics, each of which may be affected differently by a user's single decision—a concept that is described in further detail below.

The timer value may also affect the options available to a user during the training episode. For example, the option of "take a lunch break" may only be available during a window from 10:30 am until 1:00 pm, or a "leave early on Friday" option may only be available on a Friday of the simulation before 5:00 pm. The timer value may also be used to force certain events in the training simulation to occur at a given time. For example, an "interrupter" event may be scheduled to occur at a given time during a training episode, even if the user has not chosen any interactive elements to cause such an event to occur. By integrating such "interrupter" events into a training episode, the training simulation may more closely mimic a typical workday where unexpected events may occur throughout the day.

The GUI 200 may include a to-do list 204. The to-do list 204 may contain tasks for the user to complete during a training episode. For example, the to-do list may contain items to complete before the end of the simulated day or week. In some implementations, some or all of the items on the to-do list 204 may be optional. Others may be required before the episode is completed. The GUI 200 may indicate which items are mandatory. For example, the mandatory items on the to-do list may be highlighted or have a character, such as an asterisk. Alternatively, the optional task may be highlighted or similarly marked. As discussed above, some of the tasks may only be available to the user during a certain simulated time window.

When a user selects an item on the to-do list, the item may then be highlighted, and a scenario related to the task may be presented to the user. For example, a question for the user to answer may be presented on the GUI in response to the user's selection of a particular task. In some implementations, highlighting or other marking of items on the to do list may be used to indicate information such as an urgent item, or an item that was completed unsuccessfully.

Task 206 is an example of a highlighted item in a to-do list 204. In some implementations, the items on the to-do list may be accessed in any order. The items on the to-do list may change or be restricted based on other factors, such as what the user has previously done, or the simulated time of day or day of the week. For example, a user may not be able to complete a particular task until they have completed another item on the to-do list 204. Incomplete tasks may carry over if not completed, and appear in the to-do list 204 the next simulated day or week of the episode. In some implementations, certain tasks may be marked as critical. For example, in a computer systems administrator simulation, a daily backup may be marked as a critical task, which must be completed every day. Some tasks, and their related scenarios, may have a greater influence on a user's score than other tasks, or may have no influence at all.

The GUI 200 may also include a resources section 208. For example, the resources section may contain items that may help a user answer a question or complete a task on the to-do list 204. In some implementations, some items may not provide the user with information useful to the current task, and may adversely affect their score. For example, a user may be penalized for researching stock prices when the task is to pick a meeting time. The GUI 200 may contain a partner category 210, a research category 216, a budget category 218, and/or an e-mail category 220.

The partner category 210 may include, for example, virtual partners that the user may interact with. For example, the user may choose to interact with a buyer as a partner, and the buyer may give the user information or advice related to the buyer's job function. In such an example, a pop up window, or another screen may appear with information, or a place for the user to ask the buyer a question.

In some implementations, the partner category 210 may contain graphically distinct sections, such as an internal section 212 and an external section 214. The internal section 212 may contain virtual partners that may be employees of the simulated company (e.g., buyers, managers, replenishment experts). The external section 214 may contain virtual partners that may be employed outside the simulated company, such as vendors or other external partners. In other implementations, the partner category may be divided in another way, such as by department, division, or region, to name a few examples. This may allow a trainee to better understand the resources, both internal and external to the company, that may be available when starting his or her new position.

The partners available in the partner category 210 may depend on other factors such as where the user is during the simulation, the scenario being presented, and/or the item on the to-do list 204 that is selected, to name just a few examples. In some implementations, virtual partners may be representative of other users of the system 100. For example, a buyer and a manager may participate in the simulation by accessing the client trainee system 108 and/or the client trainer system 110. In such an example, a user may interact with the buyer and the manager through the virtual partners, or other objects. For example, the virtual partners may provide feedback or send messages to the user. In another example, if a user picks an incorrect virtual partner, they may receive unhelpful, or even incorrect advice. Different virtual partners and/or types of virtual partners may be presented at different points in the simulation.

The research category 216 may allow the user to conduct research on a particular issue facing the trainee. Selecting the research category 216 may either bring the user to another screen, or may expand the section to include research options. In some implementations, options may include context specific resources the user may review or use to complete the current task. For example, a user may wish to investigate if the numbers a virtual partner told them are accurate. In another example, a user may need to research inventory and the previous year's sales to accurately forecast sales for the current year.

The budget category 218 may allow the user to work with information relating to a budget. Selecting the budget category 218 may either bring the user to another screen, or may expand the section to include budgeting options or tools. For example, the options may include category specific budgets, and budgeting tools such as calculators, forecasting tools, simulations, etc.

The e-mail category 220 may allow the user to access tools such as a user's simulated email and calendar. Selecting the e-mail category 220 may either bring the user to another screen or may expand the section to include options for accessing email or calendar functions. For example, the user may select these functions to schedule a meeting or review emails from coworkers. In some implementations, advice or information previously presented to the user (e.g., from partners) may be available to review upon selecting the e-mail category 220. This may simulate the user's review of notes that were captured during a meeting with the partner, or may simulate a partner's e-mail to the user following up on the meeting. In some implementations, a user may receive interruptions, such as an urgent email. For example, the e-mail category may change or be highlighted to alert the user to new emails or meeting requests. In some implementations, the user may be required to attend to an urgent item before they can do anything else.

The GUI 200 may also include an information bar 222. The information bar may present information to the user regarding certain scoring metrics. The information may update continuously, or in response to user actions, thus providing instantaneous feedback to the user. For example, in a retail simulation, if a user spent money to purchase items, the user's budget (one of the user's scoring metrics) may be reduced by a corresponding amount. The different metrics presented in the information bar 222 may be representative of different scoring metrics.

The different scoring metrics may be completely independent of one another, or some of the scoring metrics may have some influence on one or more of the other metrics. For example, a partnership metric may represent an overall score for how well the user is interacting with partners, which may be an independent metric. In another example, the simulation may include an in-stock percentage metric (the percentage of stores with an item in stock), which may have a corresponding influence on a sales metric. The influences metrics have on one another may correspond to a weighted average, or some other logical combination of metrics within a category.

In some implementations, clicking on a metric may bring up additional information about that metric, the scenarios and decisions influencing that metric, and/or the calculations involved in determining the metric. The metrics may be represented by a color coded bar or icon in the information bar to identify the particular metric throughout the episode. In some implementations, the metrics may be representative of a particular period of time. For example, metrics may be year-to-date, or for a specific month or week.

The information bar 222 may also contain a help button 224. When a user selects the help button, he or she may be provided context-specific or general help. For example, the help may include general instructions on how to use the simulation, or may provide context specific information related to a particular portion of the training simulation. In some implementations, the help may be searchable.

The information bar may also contain a desktop button 226. When a user selects the desktop button he or she may be presented with a desktop, for example to read news stories or access other applications. In some implementations the desktop button 226 may change or be highlighted to alert the user to a new action item or news story.

The GUI 200 may contain a workspace area 228. Material such as partner information, scenarios, question prompts, questions, answer options, and feedback may be presented in the workspace area 228. For example, a multiple choice question may be presented and the user may be given an opportunity to choose the correct answer. After a scenario has been presented to the user, the training simulation may wait for the user to respond to the problem or other material being presented.

Figure 3:
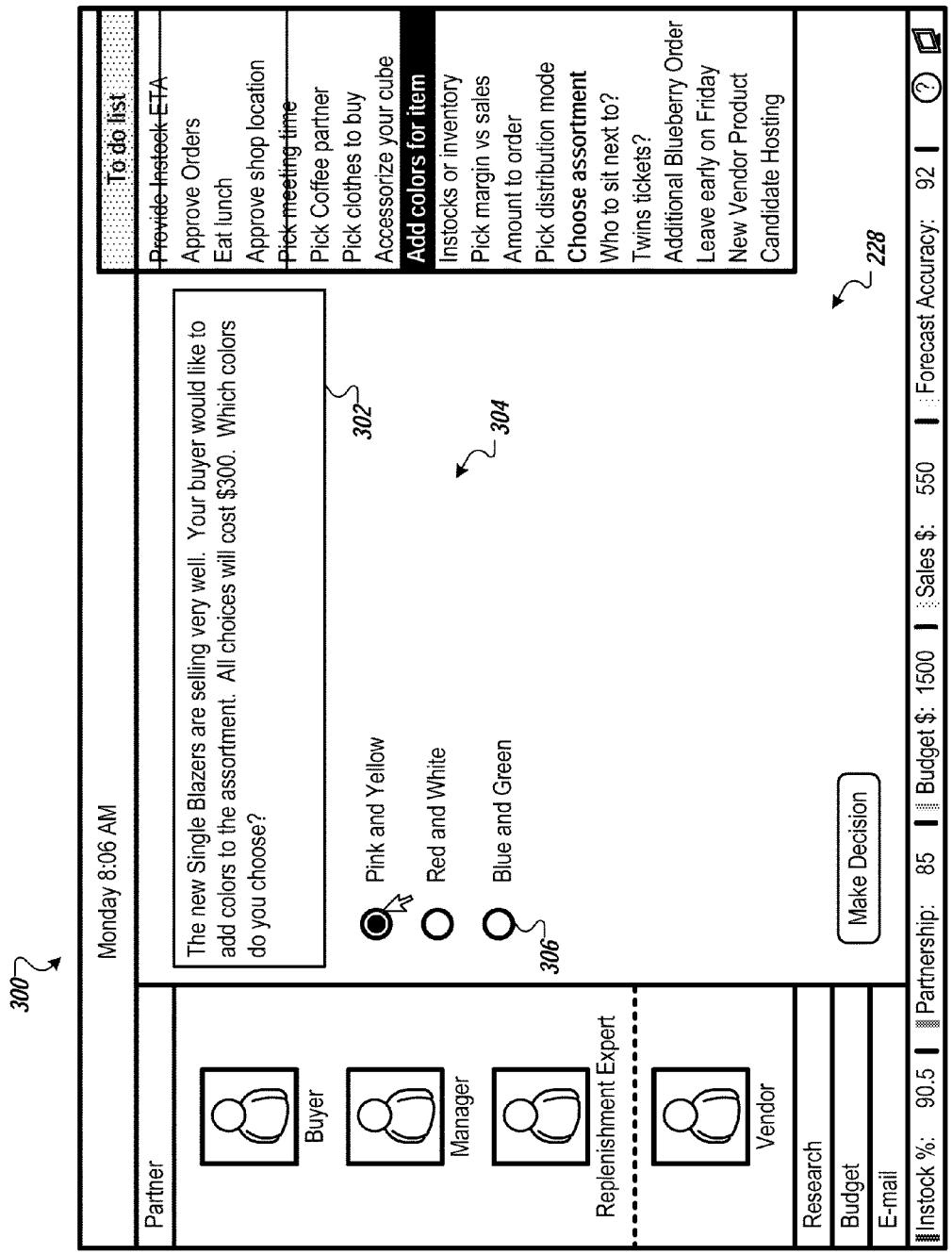
FIG. 3 shows a representative user interface of a training simulation displaying a scenario.

FIG. 3 shows a representative user interface 300 of a training simulation in which a scenario is being presented to a user. The workspace area 228 may include a scenario or task description box 302. The task description box may contain a question, a prompt for a response, and/or other information. For example, the task description box may present a multiple choice question to the user along with other information that explains the context of the question and/or provides relevant information for the user to be able to effectively answer the question.

The workspace area 228 may also contain a response area 304. In some implementations, the response area may contain potential responses to a question. For example, the question may present a particular scenario to the user, and the responses may be one or more decisions that the user may choose to make in response to the scenario. In some implementations the response area may contain a box, such as a textbox, for entering text. In other implementations, a multiple choice question may be presented in the task description box 302, and the response area 304 may contain choices for a response.

The response choices may include a radio button 306, a check box, or other means of selecting a particular response. For example, if a scenario only allows a single decision to be made, the decision options may be selected via respective radio buttons (i.e., a choose-one option). In another example, if the scenario allows the user to select multiple decisions, the decision options may be presented with corresponding check boxes (i.e., a multi-choice option).

In some implementations, when a user selects a response, the simulation may wait for confirmation from the user before applying the response. For example, the user may mark the best decision at the time, but wish to do further research (such as by clicking on the research category 216). In another example, the user may take on a new partner in the partner category 210, and the partner may provide advice. In some implementations, the question may allow more than one answer selection. For example, when choosing a color assortment, a buyer may be able to choose the answers "Pink and Yellow" and "Red and White." In other implementations, selecting a checkbox or radio button may finalize a decision.

The workspace area may include a "make decision" button 308 or other similar indicator that the user would like to finalize or confirm a decision. Clicking on the button 308 may finalize a decision, for example, after a user has selected one or more of the multiple choice responses. Upon clicking the make decision button 308, the application 104 may determine if the user response is correct, or may otherwise score the user's decision. For example, the application 104 may query the scenario database 112 to determine the most accurate response. In some situations, there may be no right or wrong answer; just different outcomes based on the user's decision. Based on the user's decisions, the application 104 may record and or adjust one or more different scoring metrics, such as the metrics displayed in the information bar 222.

The application 104 may also provide additional feedback to the user. For example, if a user answers a question incorrectly, the application 104 may present information about why the answer is incorrect, advice for solving similar problems, and/or what the correct answer is. Some decisions may affect several metrics, while other decisions may affect one or none of the metrics. Furthermore, decisions may have independent effects on each metric or related effects on one or more metrics.

The selection a user chooses may, in some situations, influence the next material to be presented. For example, if a user answers a question correctly, the simulation application 104 may present the user with a more difficult question. Two or more correct answers in a row may lead to increasingly difficult scenarios. In another example, if the user choose a particular color for an item, the simulation application 104 may present follow-up questions about that selection. Furthermore, the selection may either limit or broaden future options for tasks to complete and/or questions to answer. In some implementations, there may be multiple correct answers to a question. For example, the scenario may present check boxes next to the answers instead of radio buttons, and the user may select multiple answers.

Upon selecting an answer, the to-do list 204 may be updated to reflect the current status of that task. For example, a complete item may be crossed off the list or marked with a check mark. Items may also be marked or highlighted in other ways. For example, items completed unsuccessfully and/or items in progress may be highlighted with a color, a font enhancement, or outlined with a shape. In some implementations, an incorrect response or other incorrect user action may cause the simulation to terminate and present a final feedback screen to the user. For example, if a trainee in an air traffic controller simulation allows an aircraft to enter a potentially unsafe situation, the simulation may present feedback and mark the episode as being unsuccessfully completed.

Figure 4:
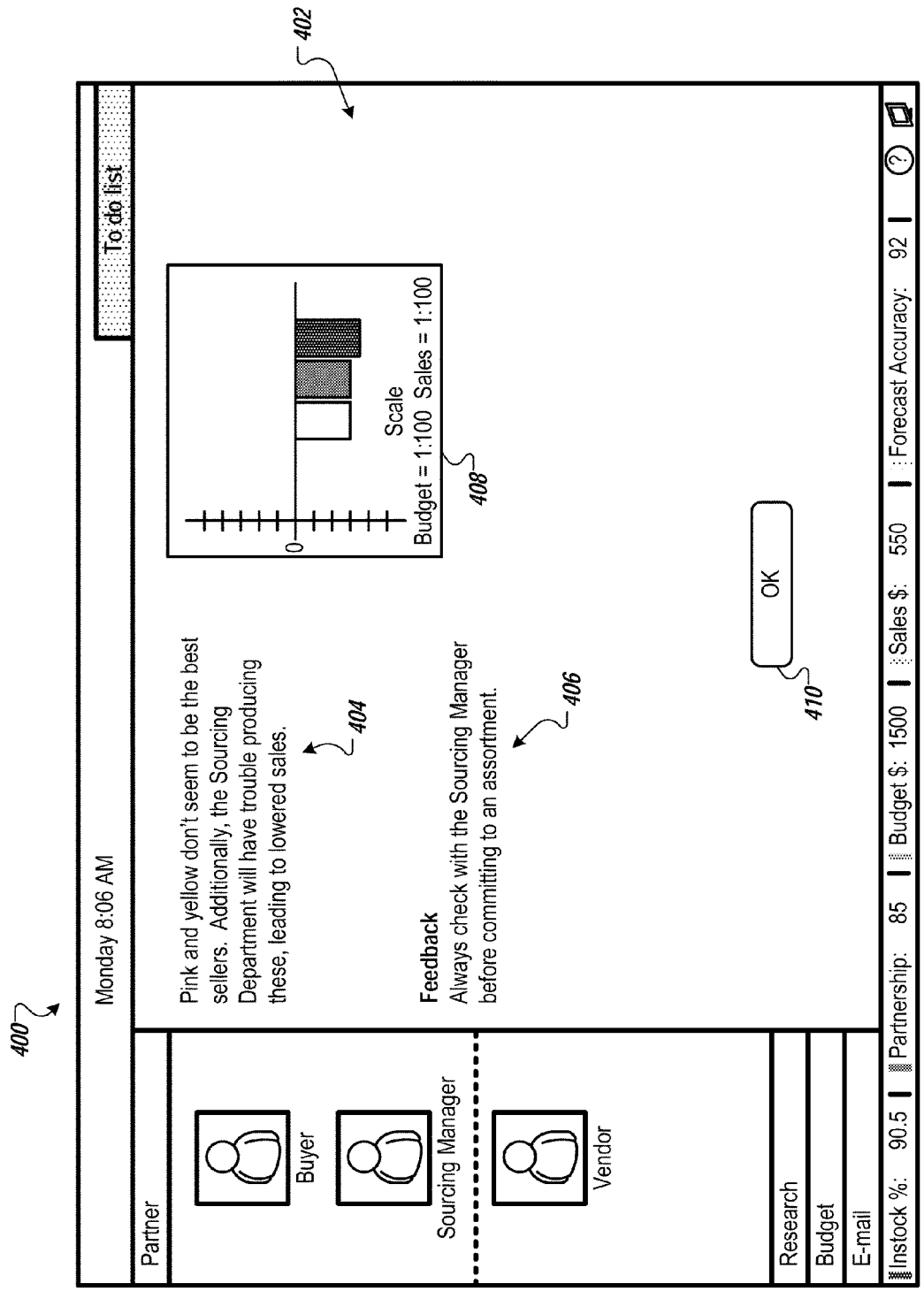
FIG. 4 shows a representative user interface of a training simulation displaying feedback.

FIG. 4 shows a representative user interface 400 of a training simulation displaying immediate feedback to a user. For example, immediate feedback may be provided in response to a question where the user did not make the best choice. Similarly, the system may reward the user with immediate feedback if he or she chooses the best option. Immediate feedback may be presented in a pop-up window, or in a window 402 that fully or partially occludes other elements of the GUI. In some implementations, other objects on the interface screen may be grayed-out. For example, some objects in the GUI may not be available for a user to select when the simulation application 104 is presenting feedback to the user. The feedback window 402 may include a text-based or multimedia description 404. The description may include feedback relating to a question and the answer a user chose. For example, the description may include a reason the answer was not the best choice, and any consequences that were a result of the choice made. The description may also indicate why other options may have been better.

The window 402 may include a feedback section 406. The feedback section 406 may include additional information related to the user's choice. For example, the feedback section may include advice for answering similar questions. In some implementations, the feedback section 406 includes information that is not in the description 404. In other implementations, the feedback section 406 may contain the same or similar information, but stated in a different way. For example, the description 404 may include general feedback, and the feedback section 406 may include more specific feedback.

The window may include a graph 408 or other visual representation of the user's decision on one or more of the scoring metrics. The graph may show the results of choices made, such as the current state of certain scoring metrics. For example, if a user chose an answer to a question that led to lower sales, that information may be reflected in the graph. The graph may also show a change in the scoring metric that occurred as a result of the user's decision. The graph may be a line graph, a bar graph, a pictograph, a pie chart, a flow chart, or another graphical representation of data, to name just a few examples. In some implementations the graph 408 may include scaling information, numerical data points, labels, and/or a key. Data in the graph may be normalized. For example, scale values for the scoring metrics may be adjusted so that the bars on a graph may fit within an allotted amount of visual space.

The feedback window 402 may include an OK button 410. The user may click on the OK button to acknowledge that they are done reviewing the information presented in the window 402. In some implementations, the window 402 may also include other buttons related to a user's options after receiving the feedback.

Figure 5:
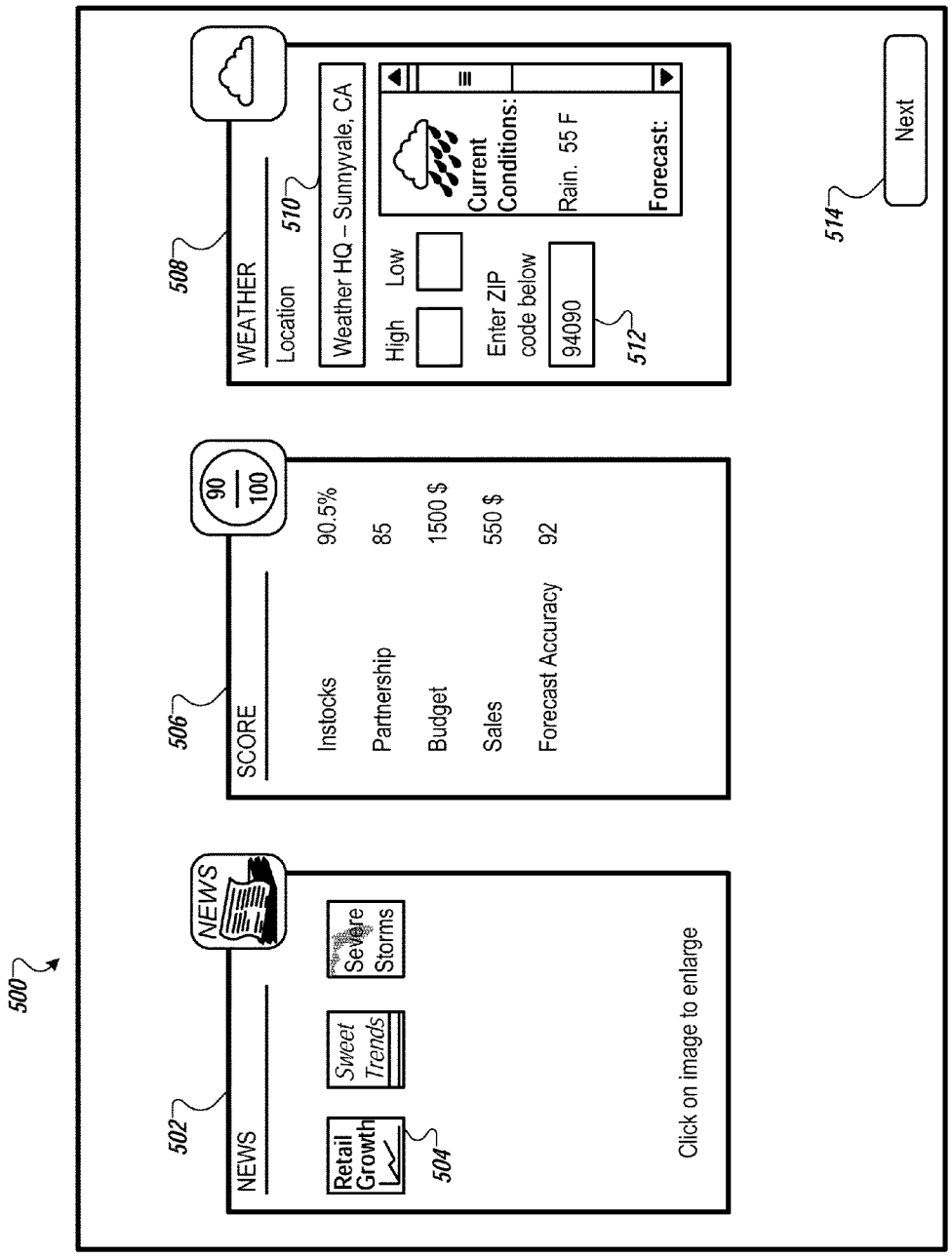
FIG. 5 shows a representative user interface of a training simulation displaying a simulated desktop.

FIG. 5 shows a representative user interface 500 of a training simulation displaying a simulated desktop, including current event information. The GUI of a desktop 500 may be presented in response to the user clicking on an object, such as the desktop button 226. The objects included in the GUI may be updated in real-time, simulated time, or in response to user actions. As such, if a user views the desktop 500 interface at one point during a simulation, the data presented may be different than another time the user views the desktop. In one example, weather data presented may change from Monday to Thursday. The objects presented may affect other aspects of the simulation. For example, bad weather in a location may affect sales of warm weather merchandise, such that a user's decision to purchase bathing suits for immediate sale during a winter storm may be scored adversely.

The user interface of desktop 500 may also include a news section 502. The news section may include one or more news events 504. For example, the news events may be accessed through a clickable icon representative of the story. When a user clicks on a news event, the news story may be presented in a window of the desktop 500. In some implementations, the news event may open in a new window. In another implementation, the news event may expand to a larger size within the news section 502 of the desktop.

The news events 504 presented on the desktop 500 may be stored in the scenario database 112. In some implementations, the news events may be randomly chosen by the simulation application 104. Thus, user experience may vary every time the simulation is used. In other implementations, the news events may be related to the tasks the user is working on. As such, whether a user chooses to view a relevant news story before making a decision may affect the scoring of the user's decision. For example, if a user views a story on consumer purchasing trends to more accurately forecast sales, they may be awarded additional points. Similarly, if a user reads a news story before making a decision that runs exactly contrary to the news story, the user's scoring metrics may be adjusted more severely than if the user had not read the story at all.

The desktop 500 may also include a score section 506. The score section may include scoring metrics and/or feedback on the user's scores. For example, the current values for the various scoring metrics may be presented. The score section 506 may contain score info that is also presented on the information bar 222.

The desktop 500 may also include a weather section 508. The weather section may include weather information and may vary based on simulated location and/or time. The weather section may include location information, such as a location box 510 or a zip code box 512. In some implementations, the location box 510, and/or the zip code box 512, may be input fields. The weather section 508 may include high and low temperature boxes and a current conditions window 514. For example, a user may type in a zip code into the zip code box 512, and the simulation may return current and forecasted weather information, along with the city and other information, within the weather section 508. In some implementations, the current conditions window may be a scrollable window. As described above, the various weather conditions, both present and forecasted, may have an effect on the adjustment of the user's scoring metrics upon making a decision. For example, if the current weather conditions are rainy, but the forecast for the following day is sunny with a high of 85 degrees, the user's decision to put off making fresh lemonade for sale until the next day may be rewarded to show that the user is capable of planning ahead.

The interface of the desktop 500 may include a next button 514. In some implementations, the GUI may include additional buttons. For example, the user may click on the next button to exit the desktop and return to a previous screen (such as another interface 200). In another implementation, the next button 514 may present additional current events, for example, in other categories.

Figure 6:
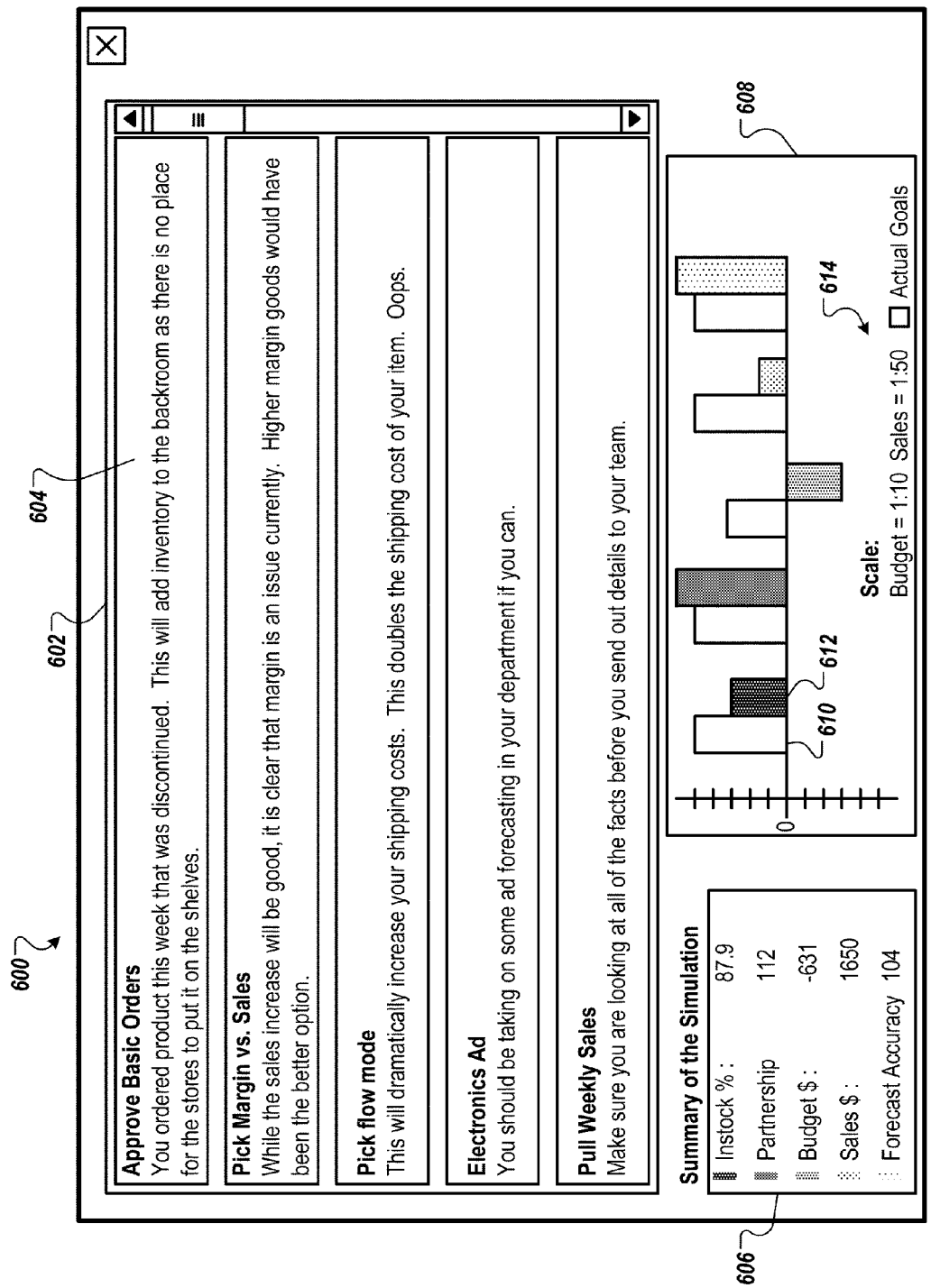
FIG. 6 shows a representative user interface of a training simulation displaying feedback results of a training episode.

FIG. 6 shows a representative user interface 600 of a training simulation displaying feedback results of a training episode. In some implementations, the results may be a summary of a single episode of a training simulation. For example, a particular episode may contain five decision points, and feedback may be presented on each of the decision points in that episode. In other implementations, the results may be a summary of multiple episodes of the training simulation, and may be cumulative of all of the user's training. Such historical training data may be stored and accessed from a user database 114.

The interface 600 may include a task results section 602. The task results section may include a task box 604 for each of the tasks in the to-do list 204, or may include a subset of all of the tasks, such as the tasks that the user completed during the training episode. In other implementations, exemplary tasks (e.g., tasks corresponding to the best/worst scores, such as the five best and worst tasks) may be presented in the task results section 602. The task results section 602 may include a scrollable box to allow the user to view additional feedback results that cannot fit on a single screen. In one example, each of the task boxes 604 may include the name of the task, and may also optionally include feedback about the particular task.

The summary feedback interface 600 may also include a summary section 606. In some implementations, the summary section may include the scoring metrics from each of the five categories of scoring as shown on the information bar 222. For example, the summary section 606 may include final results from each of the different scoring metrics categories. In some implementations, the summary section may include the name of each of the metrics, a number, and a color key. The metrics may be clickable, such that the user may obtain a summary of feedback specific to a particular scoring metric. For example, a user may click on a sales metric to get a summary of all the feedback relating to sales data.

The interface 600 may also include a results graph 608. The results graph may include a graphical representation of the metrics in the summary section 606. In some implementations, the results graph may include a goal amount 610 for some or all of the scoring metrics, along with the user's final score 612. In some implementations, the respective values of the metrics may be normalized so that the graphed values will fit within the available space. The results graph 608 may include a key 614. The key may include scaling information for some or all of the metrics presented in the graph. Furthermore, the key may contain colored boxes with descriptions representing the different metrics. In other implementations, data may be presented in other types of graphs (e.g., line graphs, scatter plots, pie charts) or in other forms. For example, a graph or table may show just the difference between a goal score and the actual score, instead of, or in addition to other information. In such an example, a negative difference may represent that the user did not meet the goal score, and a positive value may show that the user exceeded the goal.

The objects, functions, elements, and other information presented within the various training simulation GUIs described herein may be implemented within the simulation application 104 and associated databases, for example, as object oriented classes and/or object types. Each object type may also include attributes related to objects of that type.

The simulation application may include a login class, for example, that may include functions related to checking a user credentials. The login class may include security options, such as usernames, passwords, login attempts, and the like. The login class may be used to identify a particular user to the system 100, either as a client trainee user or a client trainer user. As such, the login class may be configured to communicate with a user database 114.

The simulation application may also include an XML parser. For example, an XML parser class may include functions related to parsing XML data files, e.g., to create input usable to the simulation application 104. In some implementations, the XML parser may be a static class. The use of XML data files may allow for the training simulation application to be configurable either during a configuration phase, or during runtime.

A training scenario class may also be included in the training application. The training scenario class may include functions related to accessing, presenting, and/or storing scenario data and other options related to the various training scenarios. For example, the training scenario class may be configured to pull different training scenarios from the scenario database 112, and to present the scenarios to the user via the user interface. In addition, the training scenario class may include functions related to scoring the user's decisions corresponding to the various scenarios during a training simulation episode.

The application may also include a graph class, a navigation class, and/or a task list menu class. Functions in the graph class may display XML information in a graphical format. For example, the graph class may include algorithms for displaying metrics in a bar or line graph. Functions in the navigation class may retrieve XML information and display it in an accordion format or other navigational format. For example, the individual sections within resources section 208 may expand when a user clicks on or moves the mouse over or near the section. In some implementations, when a particular section expands, the others may collapse. The task list menu class may include functions for retrieving and displaying the activities to be performed in a task list menu, such as the to-do list 204.

A timer class may also be included in the simulation application. Functions in the timer class may handle the timer functionality. For example, the timer class may manage the functionality and the information presented in the timer section 202. In addition, the timer class may include functions related to correlating certain system events with the simulated time of the training simulation.

Figure 7:
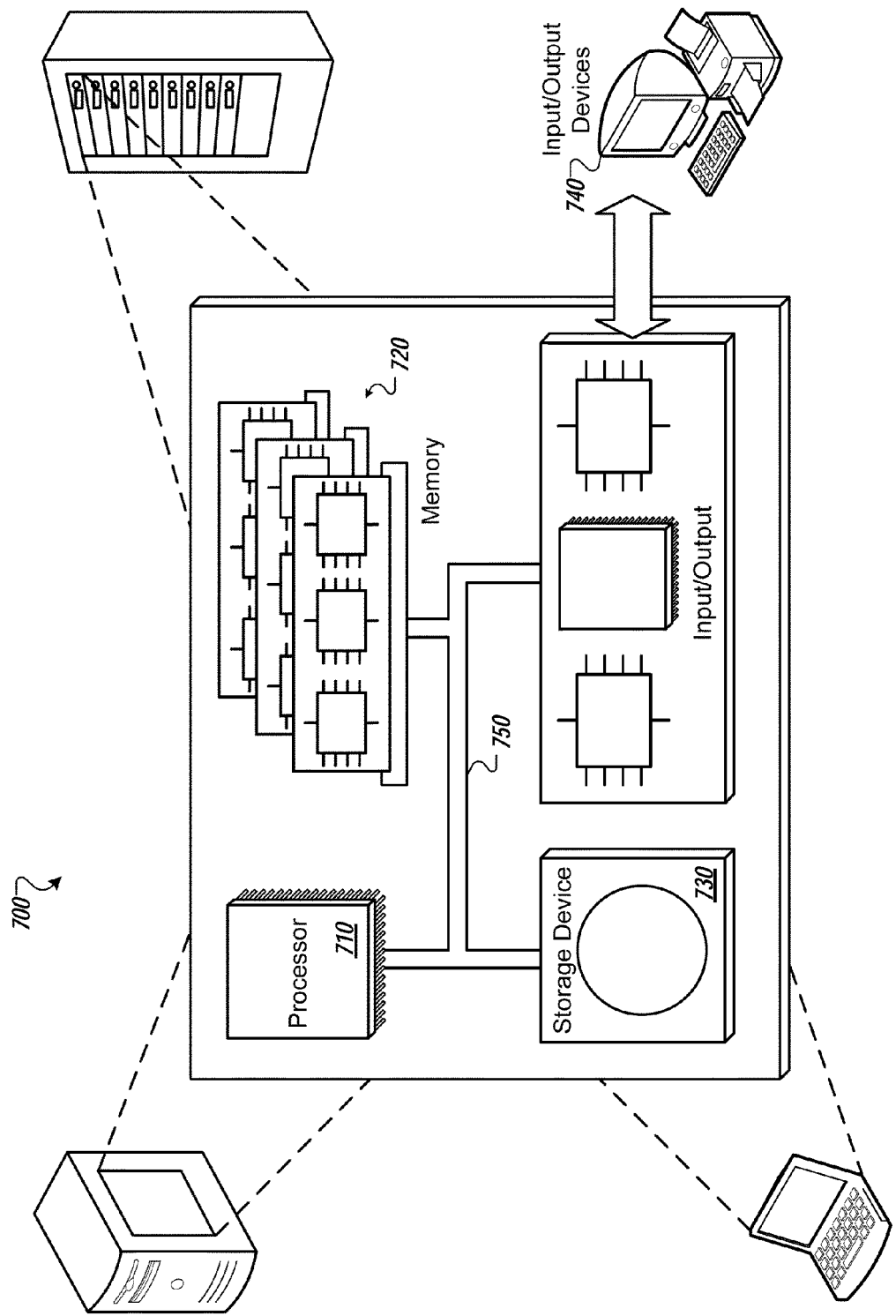
FIG. 7 shows a block diagram of a representative computing system.

FIG. 7 is a schematic diagram of a representative computer system 700. The system 700 can be used for the operations described in association with any of the computer-implement methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method of training using a simulator, the method comprising:
   initiating, at a computer, a training episode;
   tracking a simulated time of the training episode, the simulated time being tracked with a simulation timer, wherein the simulation timer advances throughout the duration of the training episode, and advances at a rate that is different than real-time;
   displaying, on a graphical user interface, a time indicator corresponding to the simulated time of the training episode;
   displaying, on a graphical user interface, a partner category including two or more virtual partners the participant may interact with during a training episode;
   presenting a scenario to a user via the graphical user interface, the scenario including information relating to a decision to be made by the user, a prompt for the user to make the decision, and two or more decision options corresponding to the scenario, the decision options being selectable by the user;
   receiving, via user input to the graphical user interface, a response corresponding to the scenario and including selection of one or more of the decision options;
   determining the simulated time at which the response was received;
   scoring, using two or more scoring metrics, the response by adjusting the value of the two or more scoring metrics based on the one or more selected decision options, and by adjusting the value of one or more of the scoring metrics also based on the simulated time at which the response was received, the scoring metrics each relating to a different user performance indicator; and
   ending the training episode when the simulated time reaches a determined ending time.

2. The method of claim 1, wherein the training episode relates to a simulation of a retail business, and wherein the scoring metrics include at least two selected from the group consisting of i) in-stock percentage, ii) partnership, iii) budget, iv) sales, and v) forecast accuracy.

3. The method of claim 1, wherein scoring the response is also based on one or more previous responses by the user.

4. The method of claim 3, wherein a magnitude with which the value of one of the scoring metrics is adjusted is based on one or more previous responses by the user.

5. The method of claim 1, wherein scoring the response is also based on one or more responses by the user during a previous training episode.

6. The method of claim 1, father comprising displaying a set of selectable user tasks that correspond to the scenarios presented to the user, and wherein the selection of one of the user tasks results in a corresponding scenario being presented to the user.

7. The method of claim 6, wherein the set of selectable user tasks is based on the simulated time of the training episode.

8. A computer-implemented method of training using a simulator, the method comprising:
   initiating, at a computer, a training episode;
   tracking a simulated time of the training episode, the simulated time being tracked with a simulation timer, wherein the simulation timer advances throughout the duration of the training episode, and advances at a rate that is different than real-time;
   displaying, on a graphical user interface, a time indicator corresponding to the simulated time of the training episode;
   displaying, on a graphical user interface, a partner category including two or more virtual partners the participant may interact with during a training episode;
   presenting a scenario to a user via the graphical user interface, the scenario including information relating to a decision to be made by the user, a prompt for the user to make the decision, and two or more decision options corresponding to the scenario, the decision options being selectable by the user;
   receiving, via user input to the graphical user interface, a response corresponding to the scenario and including selection of one or more of the decision options;
   scoring, using two or more scoring metrics, the response by adjusting the value of the two or more scoring metrics based on the one or more selected decision options, and by adjusting the value of one or more of the scoring metrics also based on one or more previous scored responses, the scoring metrics each relating to a different user performance indicator; and
   ending the training episode when the simulated time reaches a determined ending time.

9. The method of claim 8, wherein the training episode relates to a simulation of a retail business, and wherein the scoring metrics include at least two selected from the group consisting of i) in-stock percentage, ii) partnership, iii) budget, iv) sales, and v) forecast accuracy.

10. The method of claim 8, further comprising determining the simulated time at which the response was received, and wherein scoring the response is also based on the simulated time at which the response was received.

11. The method of claim 8, wherein the magnitude with which the value of one of the scoring metrics is adjusted is based on one or more previous responses by the user.

12. The method of claim 8, wherein scoring the response is also based on one or more responses by the user during a previous training episode.

13. The method of claim 8, further comprising displaying a set of selectable user tasks that correspond to the scenarios presented to the user, and wherein the selection of one of the user tasks results in a corresponding scenario being presented to the user.

14. The method of claim 13, wherein the set of selectable user tasks is based on the simulated time of the training episode.

15. A computer program product tangibly embodied in a non-transitory computer-readable storage device, the computer program product including instructions that, when executed, perform steps for training a participant, comprising:
   determining an artificial time that has elapsed in a training seminar, wherein the artificial time advances at a substantially different rate than real-time;
   displaying to a training seminar participant an indication of the elapsed time;
   presenting a training situation to the participant, the situation including information relating to a decision to be made by the participant and two or more decision options corresponding to the situation, the decision options being selectable by the participant;

scoring the decision option selected by the participant by automatically adjusting the value of two or more scoring metrics, at least one of the two or more scoring metrics is based on the interaction of the participant with one or more individuals; and terminating the training seminar when a predetermined elapsed time is reached.

16. The computer program product of claim 15, wherein the one or more individuals includes at least one of a buyer, a manager, a replenishment expert and a vendor.

17. The computer program product of claim 16, further comprising adjusting a scoring metric based on one or more previous scored responses by the participant.

18. The computer program product of claim 15, wherein the training seminar comprises an episode of an episodic training series and the scoring is lowered based on one or more incorrect responses by the participant during a previous training episode to one or more decision options.

19. The computer program product of claim 18, further comprising displaying a set of selectable tasks that correspond to training episodes, wherein the selection of one of the tasks results in a corresponding episode being presented to the participant.

20. The computer program product of claim 15, further displaying, on a graphical user interface, a partner category including two or more virtual partners the participant may interact with during a training episode.

* * * * *